United States Patent [19]
Smith et al.

[11] Patent Number: 5,800,028
[45] Date of Patent: Sep. 1, 1998

[54] TERMINAL BLOCK HINGE MECHANISM

[75] Inventors: William D. Smith; Harbin C. Farr, both of Marietta; Craig O. Belflower, Fayetteville; Wendi J. Sams, Atlanta, all of Ga.

[73] Assignee: Communications Technology Corporation, Madison, Ala.

[21] Appl. No.: 805,220

[22] Filed: Feb. 27, 1997

[51] Int. Cl.$^6$ ................................................. H05K 5/00
[52] U.S. Cl. ...................... 312/223.1; 312/328; 174/50; 16/277
[58] Field of Search ................... 312/223.1, 326, 312/327, 328, 329; 16/277, 278; 174/50, 66, 67; 220/3.8

[56] References Cited

U.S. PATENT DOCUMENTS

| | | | |
|---|---|---|---|
| 539,741 | 5/1895 | Ingram . | |
| 745,891 | 12/1903 | Ocumpaugh | 16/278 |
| 1,122,322 | 12/1914 | Smith | 16/292 |
| 2,206,848 | 7/1940 | McAvoy . | |
| 2,948,015 | 8/1960 | Hansen . | |
| 2,967,638 | 1/1961 | Burman, Jr. . | |
| 3,140,344 | 7/1964 | Slater et al. | 174/67 |
| 3,237,239 | 3/1966 | Rudnick . | |
| 3,550,187 | 12/1970 | Swartz . | |
| 3,950,818 | 4/1976 | Holmes | 16/277 X |
| 4,406,379 | 9/1983 | Anderson et al. . | |
| 4,697,720 | 10/1987 | Hotchkiss et al. | 220/3.8 X |
| 4,845,809 | 7/1989 | Pillifant et al. . | |
| 4,895,271 | 1/1990 | Desjardins et al. . | |
| 4,971,220 | 11/1990 | Kaufman et al. . | |
| 4,979,634 | 12/1990 | Begley | 174/67 X |
| 4,993,772 | 2/1991 | Charen | 16/342 X |
| 5,034,858 | 7/1991 | Kawamoto et al. | 361/681 X |
| 5,101,079 | 3/1992 | Rodrigues et al. . | |
| 5,254,808 | 10/1993 | Rodrigues et al. . | |
| 5,355,557 | 10/1994 | Cress et al. | 16/286 |
| 5,430,248 | 7/1995 | Levy . | |
| 5,448,027 | 9/1995 | Hoffman et al. . | |

FOREIGN PATENT DOCUMENTS 2140073 11/1984 United Kingdom ............ 16/277

OTHER PUBLICATIONS

One (1) page PSI Telecom advertisement ATS 4000 Series Pole Mount Terminal 1994.

Marine Hinge cover model 61E8, manufactured by Carlon, a Lamson & Sessions Company date of manufacture unknown.

*Primary Examiner*—Peter M. Cuomo
*Assistant Examiner*—Hanh V. Tran
*Attorney, Agent, or Firm*—Watts, Hoffman, Fisher & Heinke Co., LPA

[57] ABSTRACT

An enclosure for a terminal block that provides a telecommunications transmission connection. The enclosure includes a housing that defines an interior region adapted to support a terminal block. The housing has an open front face and includes a rear wall, and a number of side walls that border the interior region. A cover is attached to one side wall of the housing for covering the interior region. The cover is moveable to a partially open, a widely open, or a fully open position to allow access to the interior region of the housing. One side wall of the housing includes a socket member that defines a groove. A hinge structure is rotatably moveable within the socket member for attaching the cover to a side wall of the housing. Biasing means are seated within the groove and interposed between the hinge structure and socket member. The biasing means bias the cover against rotatable movement between the closed position and the partially open position, or between the partially open position and the widely open position, or between the widely open position and the fully open position. The biasing means includes a leaf spring having first and second flexible legs, the first of which is secured within the groove, the second of which contacts the hinge structure to provide a resistive force against rotatable movement of the hinge structure.

9 Claims, 7 Drawing Sheets

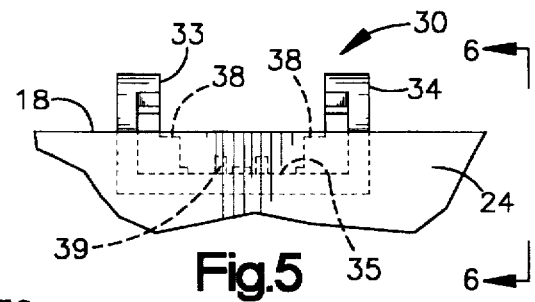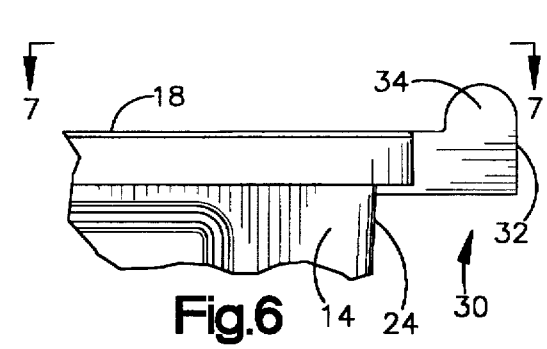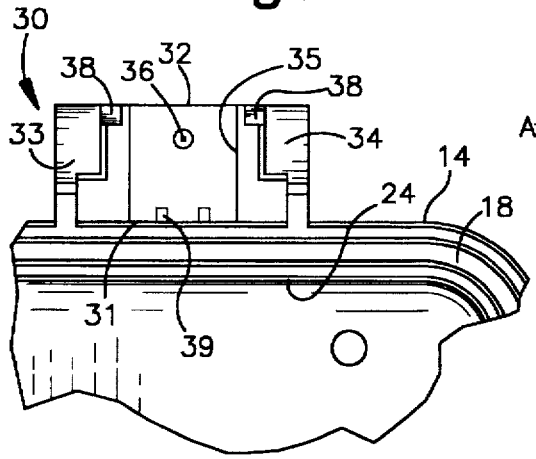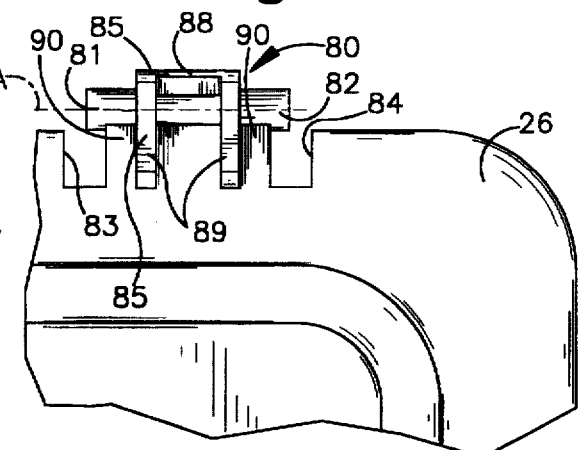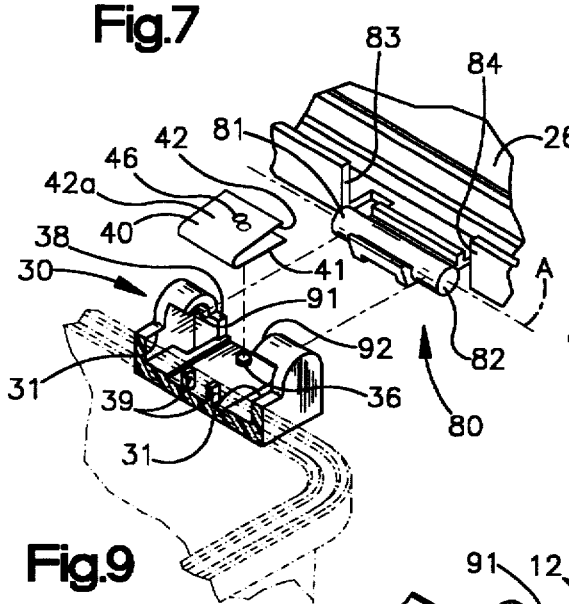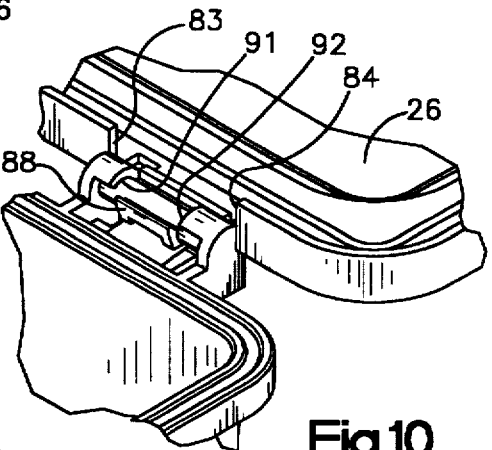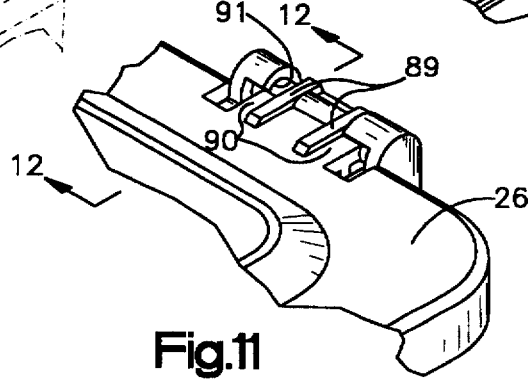

5,800,028

1

TERMINAL BLOCK HINGE MECHANISM

FIELD OF THE INVENTION

The present invention concerns an aerial enclosure for a terminal block and, more particularly, an aerial enclosure that has a cover that is moveable to a partially open or a widely open position.

BACKGROUND ART

In the telecommunications industry, trunk or feeder cables deliver signals from a telephone company office to subscribers throughout a region. At spaced locations the trunk cables are tapped into and routed to a terminal block mounted within an enclosure housing that protects the terminal block from moisture, dirt or other elements. Within the enclosure the terminal block is connected to multiple strands of a cable stub which splices into the telephone feeder cable.

The terminal block enclosure is usually pole mounted, wall mounted, or strand mounted and includes a cover that allows access to the interior of the enclosure for connecting telecommunications wiring to customer sites. A variety of prior art enclosures include a cover that is hingedly attached to the enclosure housing. Accessibility of the enclosure can vary depending on the mounting configuration and the cover selected. For example, in a strand mounted aerial application the installer is typically working in conditions where handling of the cover may be hindered by high winds or strand vibrations. It is desirable to have the cover permanently attached to the housing and yet easily moveable to permit access to the interior of the enclosure.

Attached covers typically include a hinge mechanism whereby the cover either remains in a closed position or open position. A resistive force, for example by use of a spring, resists movement of the cover to either position. The resistive force is overcome by exerting a force on the cover. Oftentimes, however, surrounding hardware can obstruct or interfere with the movement of the cover. For example, in a strand mount application the strand or trunk line may prevent the cover from being moved to its open position. This is undesirable since the spring mechanism continues to urge the cover to its closed position while the installer attempts to overcome the resistive force and move the cover to its open position. Consequently, the cover and spring mechanism may interfere with servicing interior components since the installer must hold the cover open against the spring force in order to have access to the enclosure interior.

DISCLOSURE OF THE INVENTION

The present invention provides an improved enclosure for a terminal block that provides a telecommunications transmission connection. The enclosure includes a housing that defines an interior region adapted to support a terminal block. The housing has an open front face, a rear wall, and a number of side walls that border the interior region. A cover is attached to one of the side walls of the housing for covering the interior region. The cover is moveable to a partially open, widely open, or fully open position to allow access to the interior region of the housing for servicing the terminal block or telecommunications wiring connected to the terminal block. A side wall of the housing includes a socket member that defines a groove. The cover is attached to a side wall of the enclosure housing by hinge structure rotatably moveable within the socket member. A spring seats within the groove and is interposed between the hinge structure and the socket member. The spring biases the cover against rotatable movement between the closed position and the partially open position, between the partially open position and the widely open position, and between the widely open position and the fully open position.

In the preferred embodiment, the spring is a leaf spring having first and second flexible legs. The first leg is secured within the groove of the socket member. The second flexible leg contacts the hinge structure to provide a resistive force against rotatable movement of the hinge structure.

According to the present invention, the cover permits access to the interior region of the enclosure and the electrical components therein with the choice of one of two stable open positions. The cover can be pivotally rotated either to a stable partially open position or a stable widely open position by applying a force sufficient to overcome the resistive force of the leaf spring disposed between the hinge structure and the socket member. Since the resistive force of the spring increases between the cover's closed position and partially open position, or between the cover's partially open and widely open position, or between the cover's widely open position and fully open position, the cover is biased towards remaining closed, partially open, or widely open.

The enclosure can be adapted to mount to a pole, wall, or an aerial strand. If the physical location or desired mounting configuration prohibit movement of the cover to a widely open position (for example, if movement of the cover to a widely open position would be obstructed by or interfere with neighboring hardware), then the cover can be opened to its partially open position. Since the cover remains stable in its partially open position, internal electrical components can be repaired or replaced without the need to hold the cover open or resist movement of the cover into a different position.

In accordance with a preferred embodiment of the invention, the hinge structure includes first and second flat portions. The first flat portion maintains contact with the second flexible leg of the leaf spring when the cover is in a partially open position. The second flat portion maintains contact with the second flexible leg when the cover is in a widely open position. The flat portions of the hinge structure substantially improve stability of the cover when the cover is moved to its partially or widely open positions. When the cover is forced from one of these positions, the resistive force of the spring increases and the cover becomes unstable, or biased towards occupying either its closed position or partially or widely open positions.

From the above it is seen that one object of the invention is to allow access to the interior of a terminal block enclosure with the cover open in a partially open position or a widely open position. This and other objects, advantages and features of the invention will be described in conjunction with a detailed description of a best mode for practicing the invention.

3

Figure 1:
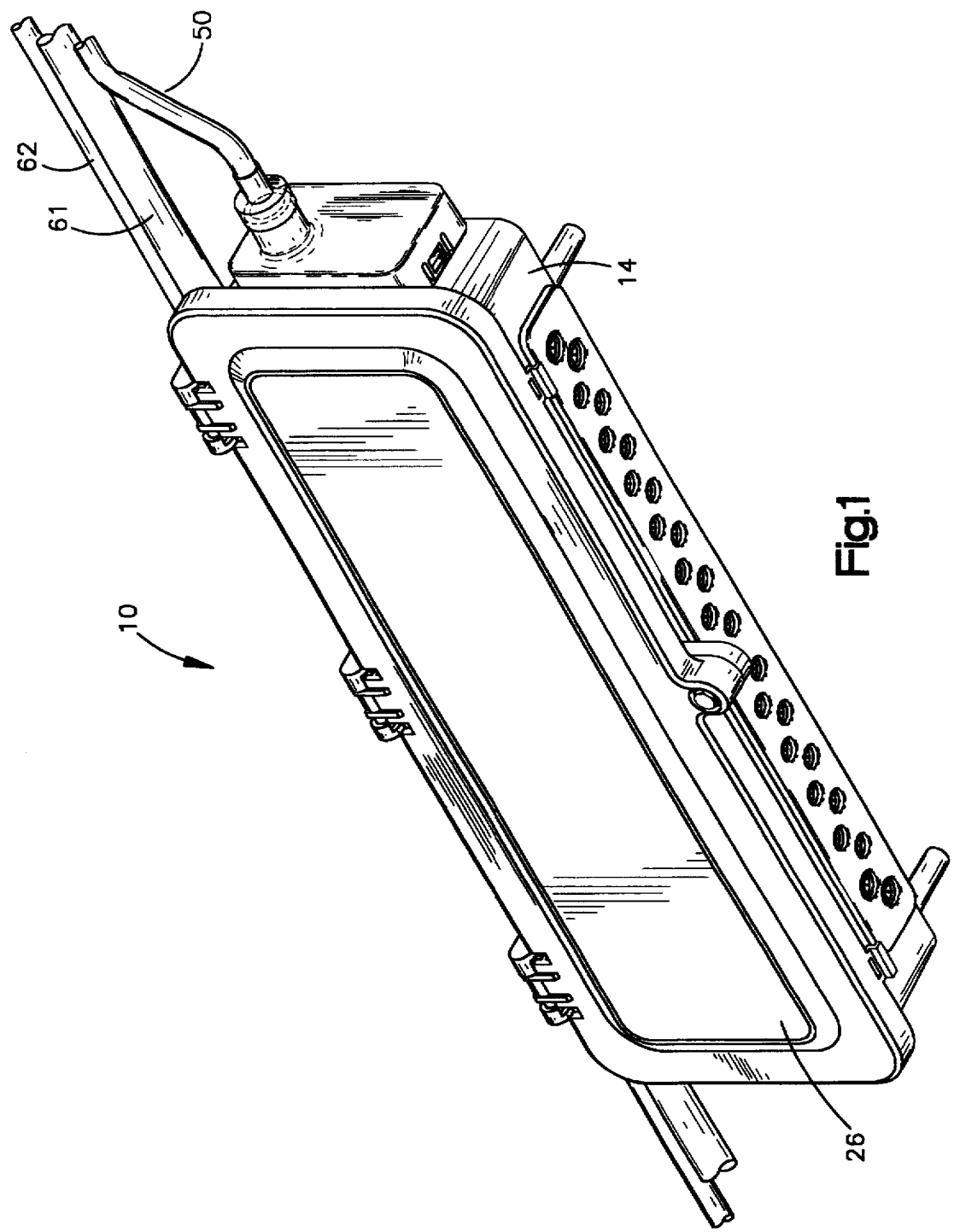
FIG. 1 is a perspective view of a terminal block enclosure constructed in accordance with the present invention.
Figure 3:
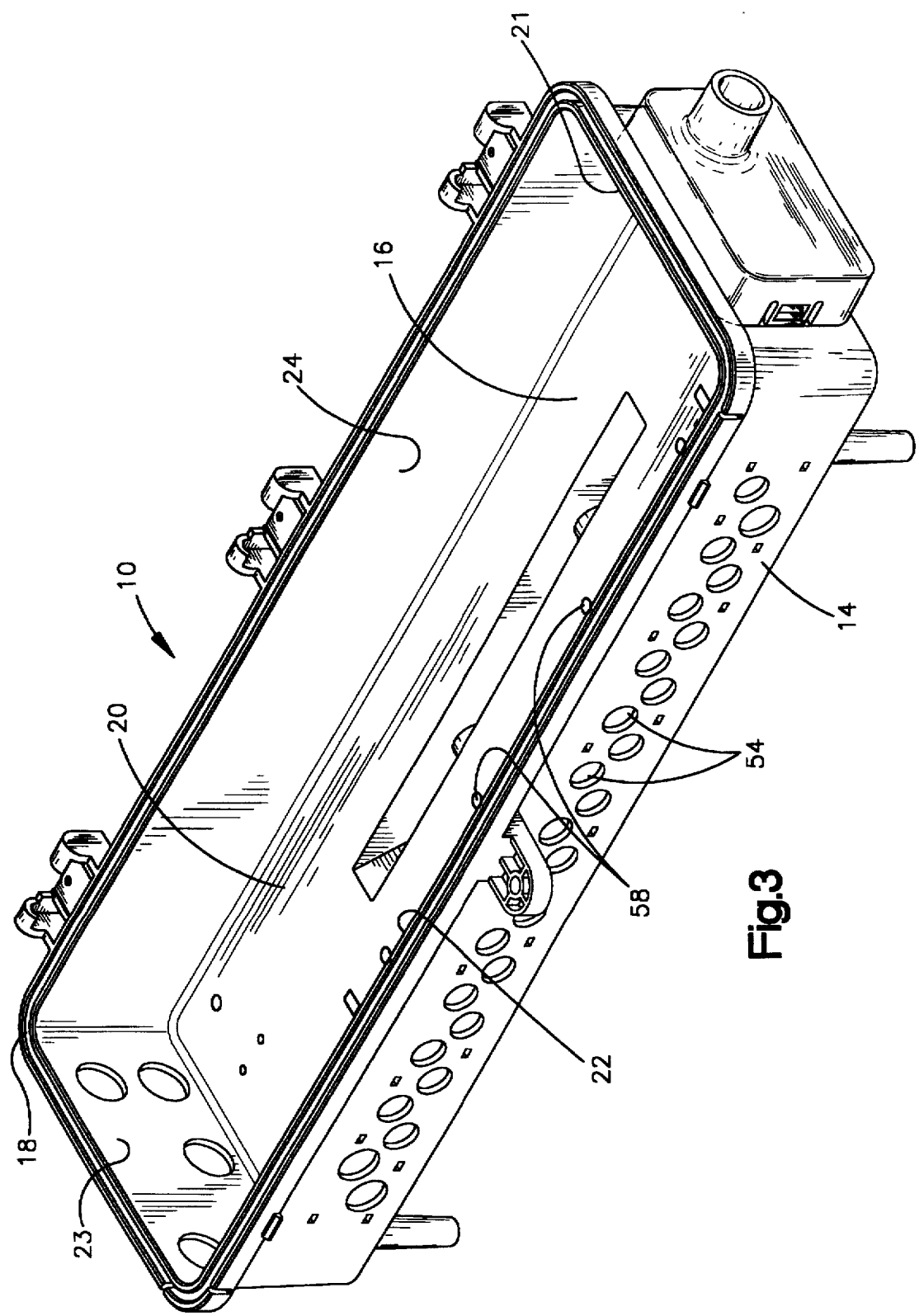
FIG. 3 is a perspective view of the FIG. 1 enclosure with the cover removed showing socket members on one side wall of an enclosure housing.
Figure 4A:
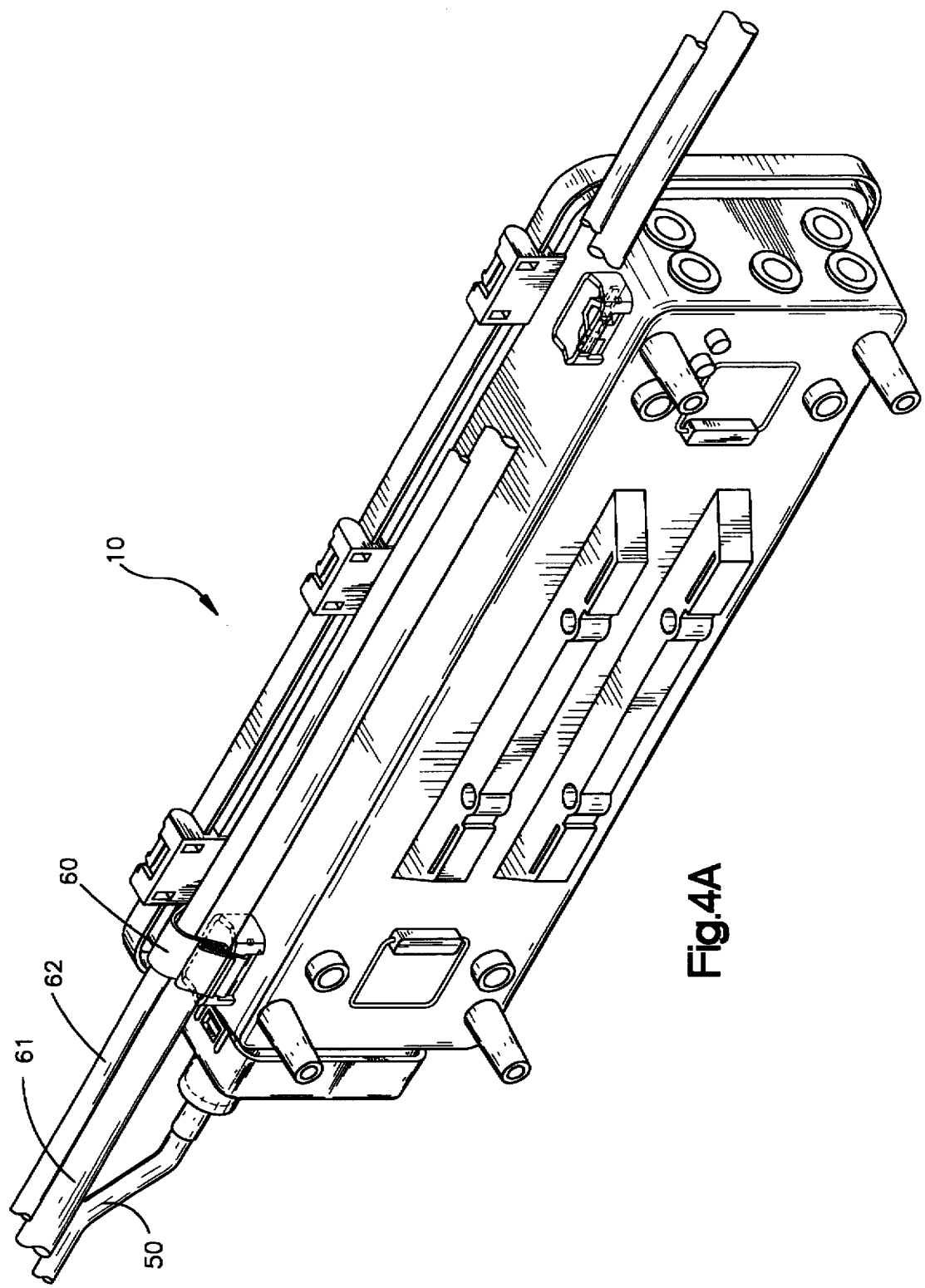
FIG. 4A is a perspective view of the FIG. 1 enclosure showing the bottom of the enclosure and a strand loop hanger.
Figure 4B:
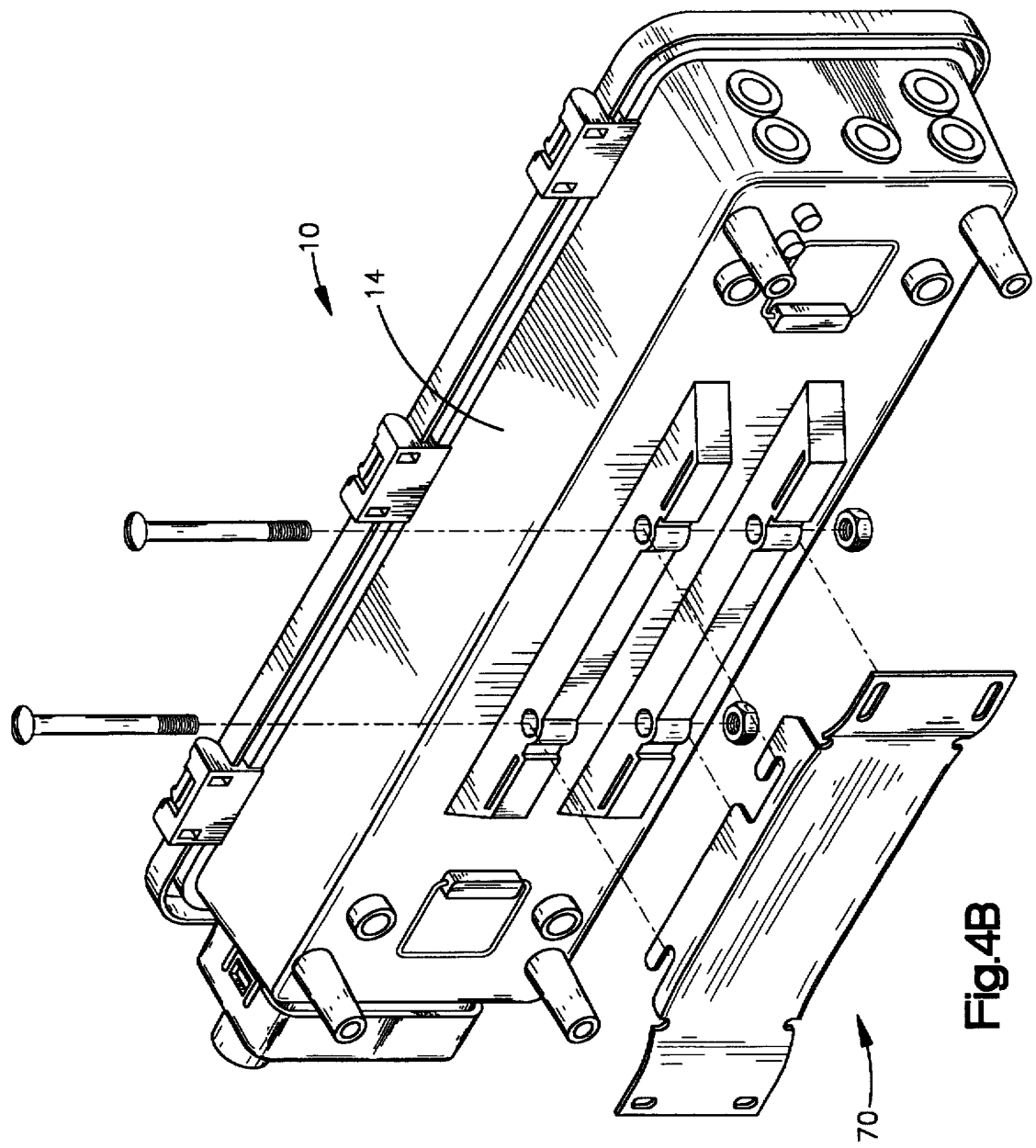
Figure 14:
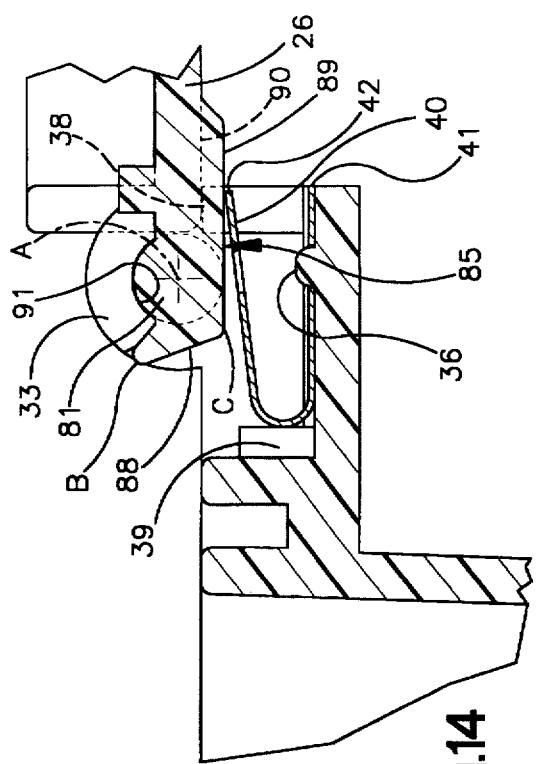
Figure 15:
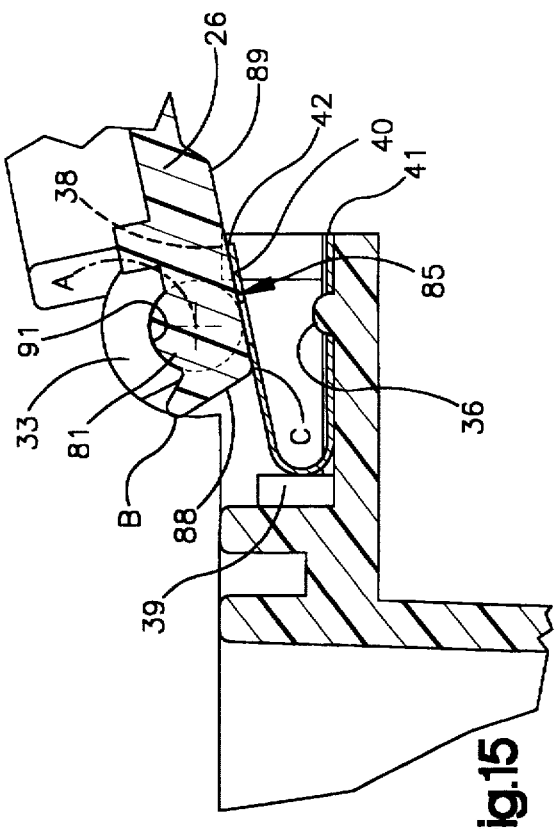
Figure 12:
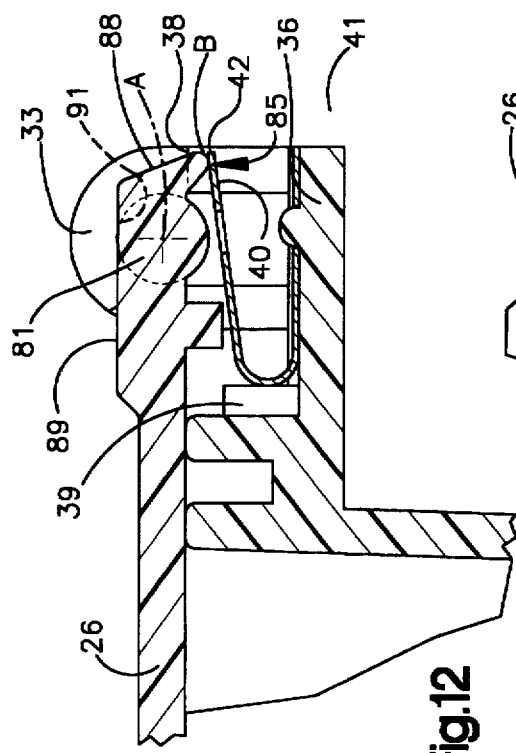
Figure 13:
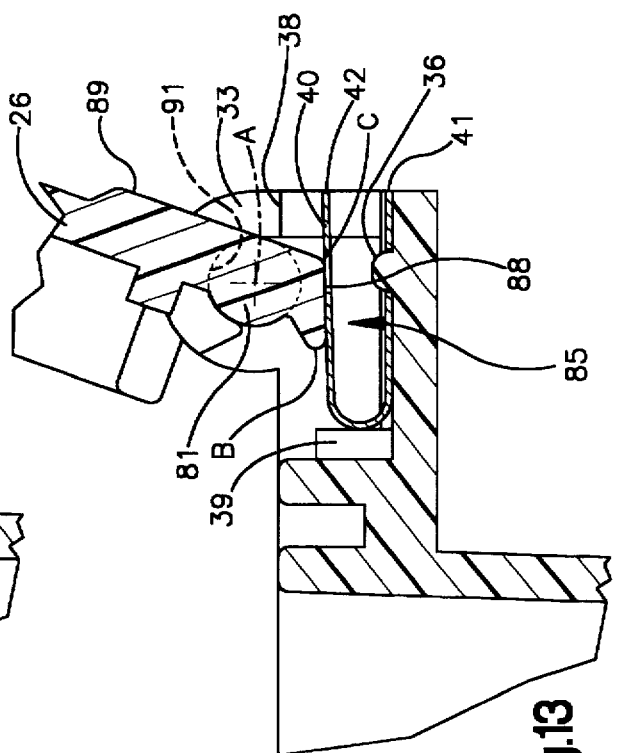

FIG. 4B is a perspective view of the FIG. 1 enclosure showing the bottom of the enclosurepole mount bracket;

FIG. 5 is a broken front side view of the FIG. 3 enclosure showing a socket member;

FIG. 6 is a broken right side view of the FIG. 3 enclosure as seen from the plane 6—6 in FIG. 5 showing the socket member;

FIG. 7 is a broken plan view of the FIG. 3 enclosure as seen from the plane 7—7. showing the socket member;

FIG. 8 is a broken plan view of the FIG. 3 enclosure showing the hinge structure removed from the enclosure housing;

FIG. 9 is a broken perspective view of an enclosure constructed in accordance with the present invention showing a hinge structure, socket member, and leaf spring in a disassembled condition;

FIG. 10 is a broken perspective view of the FIG. 9 enclosure showing the hinge structure, socket member, and leaf spring in an assembled condition and showing the cover in a stable widely open position;

FIG. 11 is a broken perspective view of the FIG. 9 enclosure showing the cover in a stable closed position;

FIG. 12 is an enlarged broken section view of the FIG. 11 enclosure as seen from the plane 12—12 in FIG. 11 showing the cover in a stable closed position;

FIG. 13 is an enlarged broken section view of the FIG. 11 enclosure showing the cover in a stable partially open position;

FIG. 14 is an enlarged broken section view of the FIG. 11 enclosure showing the cover in a fully open position, the leaf spring in a partially flexed configuration, and hinge structure in contact with a stop member; and FIG. 15 is an enlarged broken section view of the FIG. 11 enclosure showing the cover in a stable widely open position and the leaf spring substantially in an unflexed configuration.

BEST MODE FOR PRACTICING THE INVENTION

Figure 2:
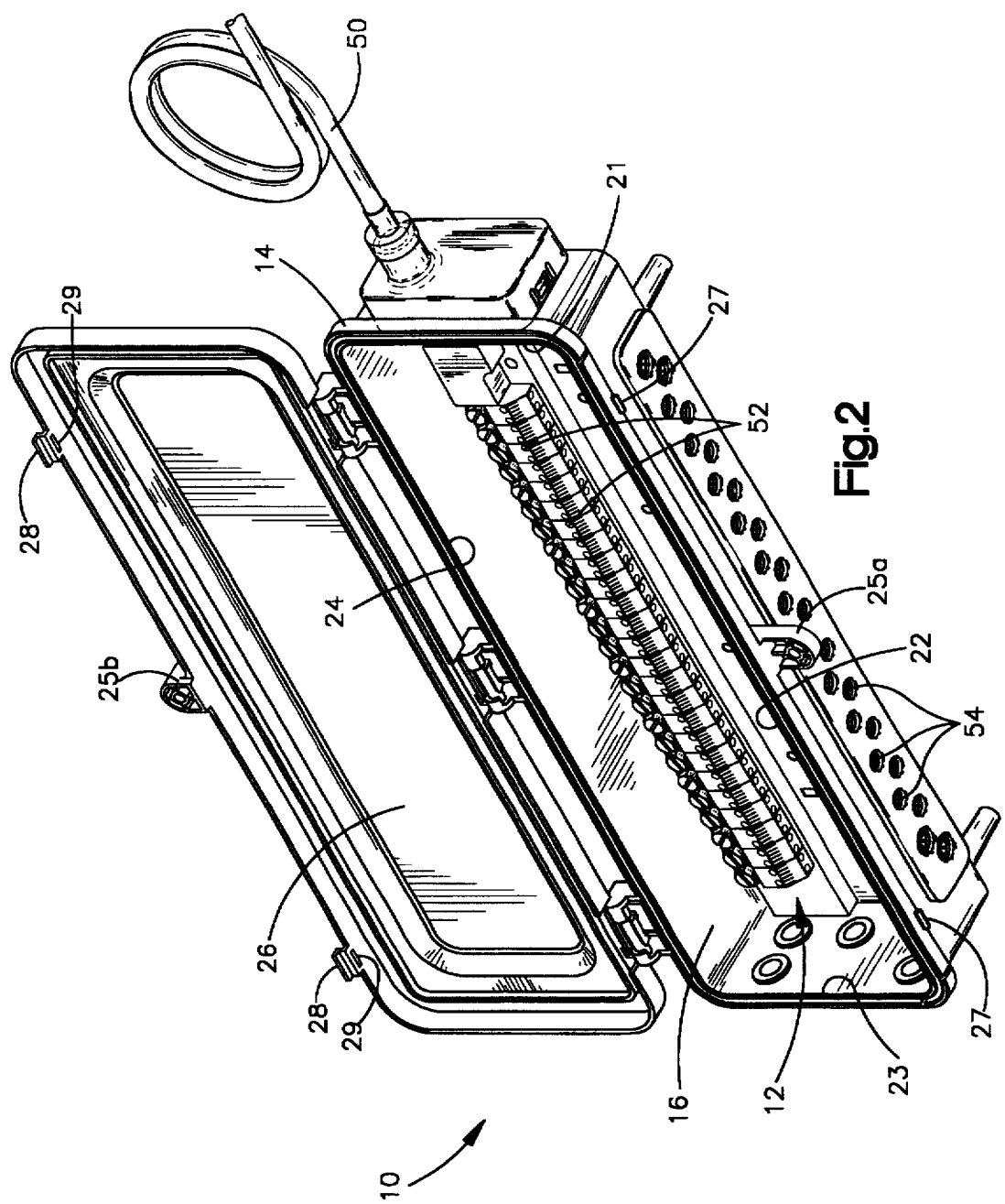
FIG. 2 is a perspective view of the FIG. 1 enclosure with a cover opened to a widely open position to expose a terminal block and cable stub mounted within the enclosure.

Referring now to the drawings, FIGS. 1–4 illustrate an enclosure 10 for a terminal block 12. The enclosure 10 is molded from plastic and includes a housing 14 that defines an interior region 16 adapted to support the terminal block 12 within the enclosure 10. As shown in FIG. 3, the housing 14 includes a rear wall 20 and side walls 21, 22, 23, 24 that border the interior region 16. A front face 18 of the enclosure 10 is open. A cover 26 is connected to the housing 14. As shown in FIG. 1, the cover 26 can be moved to a closed position to cover the interior region 16 of the enclosure 10 or, as shown in FIG. 2, to an open position to expose the interior region 16. Opening the cover 26 exposes the terminal to allow communications cable to be attached to the terminal block 12 and routed away from the enclosure 10.

The enclosure housing 14 includes latching projections 27 made integral with the housing 14. The cover 26 includes flexible retaining tabs 28 which define notches 29 for receiving the latching projections 27 and secure the cover 26 to the enclosure 10 when the cover 26 is moved to its closed position. The enclosure housing 14 further includes a latching lug 25a that secures a threaded insert. The cover 26 includes a latching lug 25b in cooperating relationship to the latching lug 25a when the cover 26 is in a closed position. The latching lug 25b attached to the cover 26 defines a through hole through which a mounting screw is inserted and threaded into the insert of the corresponding latching lug 25a to secure the cover 26 to the enclosure 10.

4

As seen in FIG. 2, a cable stub 50 is connected to the terminal block 12. The stub 50 contains pairs of source telecommunications wires which, at one end, terminate into the terminal block 12 where they are typically inserted into a gel and electrically connected to insulation displacement connectors, or IDC driver modules 52, attached to the terminal block 12. At the other end of the cable stub 50 (not shown), the stub 50 and telecommunications wires therein terminate into a connector adapted to connect to a communications feeder cable 61, as shown in FIG. 1. The feeder cable 61 is typically integrated with a source module such as a 710 connector. The stub 50 contains between 10 to 50 pairs of source wires. The IDCs 52 are adapted to receive subscriber telecommunications wires that are routed through drop wire entry passages 54 of the enclosure 10 and to the subscriber's premises. Depending on the application, a terminal block 12 having threaded studs, or binding posts, that protrude from the terminal block 12 can be used wherein the subscriber wires are wrapped around the posts and secured with a nut. The terminal block 12 is typically attached to the rear wall 20 of the enclosure 10 by a number of fasteners that extend through holes 58 in the rear wall 20.

The enclosure 10 can be adapted to mount in various aerial applications such as pole mount, wall-mount, or strand-mount configurations. For example, FIG. 4A shows the enclosure 10 attached by metal straps 60 around the communications feeder cable 61 and to a support strand 62. As shown in FIG. 4B, the enclosure 10 can also be connected to a pole-mount bracket, indicated generally by reference character 70.

As shown in FIG. 3, and in further detail in FIGS. 5 through 7, one side wall 24 of the enclosure housing 14 includes three hinge socket defining members 30 to which the cover 26 is hingedly attached. While the disclosed embodiment has three such sockets 30, the quantity and size of the socket members 30 depends on the size of the enclosure and its application.

The socket member 30 is molded from plastic and defines a partially open front portion 31 and an open rear portion 32. The disclosed socket member 30 is made integral with the enclosure housing 14 but could be connected to the side wall 24 of the enclosure 10 by fasteners or other suitable securing means. As shown in FIGS. 9 and 10, the socket member 30 cooperates with a leaf spring 40 and hinge structure 80 attached to the cover 26. The hinge structure 80 is also made of plastic and likewise can be made integral with the cover 26 or connected to the cover 26 by appropriate fastening means.

The socket member 30 includes spaced apart bearing segments 33, 34. As shown in FIG. 8, the cover 26 defines respective spaced apart cutouts 83, 84 through which the bearing segments 33, 34 pass during pivotal movement of the cover 26. The hinge structure 80 defines a cammed surface 85 that contacts the leaf spring 40 and includes generally cylindrical pivot arms 81, 82 that are received by the respective bearing segments 33, 34. The leaf spring 40 is interposed between the hinge structure 80 and the socket member 30 and seats within a groove 35 defined by the socket member 30. As shown in FIGS. 10 through 15, the pivot arms 81, 82 pivotally engage the bearing segments 33, 34 at bearing surfaces 91, 92.

Referring now to FIG. 9, the leaf spring 40 is made out of a corrosion resistant metal, such as stainless steel, and includes first and second flexible legs 41, 42. The groove 35, the width of which is shown in FIG. 7, and the depth of which is shown in FIG. 5, is sized to receive the first leg 41 of the leaf spring 40. The groove 35 secures the spring 40 so that lateral movement or slippage of the spring 40 from the socket member 30 is prevented when the spring 40 is flexed by rotatable movement of the cover 26. The socket member 30 also includes retaining posts 39 to restrict movement of the spring 40 towards the front portion 31 of the socket member 30. Any number of retaining posts 39 can be used, and, in the preferred and illustrated embodiment, the posts 39 are made integral with the molded plastic enclosure 10.

The groove 35 also includes a nub element 36. The first flexible leg 41 of the spring 40 defines a hole 46 to receive the nub element 36 when the leg 41 is inserted within the groove 35. The nub element 36 prevents slidable movement of the leaf spring 40 in the direction of the open end 32 of the socket member 30 as the spring 40 is flexed during movement of the cover 26.

To assemble the hinge structure 80 into the socket member 30, the hinge structure 80 is inserted through the partially open front portion 31 of the socket member 30. The pivot arms 81, 82 of the hinge structure 80 are slid underneath the bearing segments 33, 34 where they contact the concave bearing surfaces 91, 92. The cover 26 is placed in a closed position. The leaf spring 40 is then pushed through the open rear portion 32 of the socket member 30 with sufficient force to compress the leaf spring 40. Flexible leg 41 is slid into groove 35 so that nub element 36 protrudes through the hole 46 in the leg 41. The flexible leg 42 remains in a flexed configuration thereby maintaining a biasing force through the cammed surface 85 and against the pivot arms 81, 82. Consequently, the pivot arms 81, 82 are held in the respective bearing segments 33, 34 after the cover 26, spring 40 and housing 14 are assembled and during movement of the cover 26.

The cammed surface 85 of the hinge structure 80 comes into slidable contact with the leaf spring 40 during movement of the cover 26. According to the invention, the surface 85 is contoured so that with the leaf spring 40 disposed between the hinge structure 80 and socket member 30 the leaf spring 40 urges the cover 26 to a closed, partially open, or widely open position depending on the orientation of the cover 26. To move the cover 26 from the closed position to a partially open position, or vice versa, or from a partially open position to a widely open position, or vice versa, the cover 26 is pivotally rotated by applying a force sufficient to overcome the spring force. The desired angular displacement between the open front face 18 of the enclosure 10 and the cover 26 will vary depending on the shape of the cammed surface 85 of the hinge structure 80. In the preferred embodiment, the surface 85 is shaped so that the cover 26 is urged towards remaining in a closed position (as shown in FIG. 12), about 110 degrees from the closed position (as shown in FIG. 13), or about 170 degrees from the closed position (as shown in FIG. 15).

As shown in FIGS. 12 through 15, the hinge structure 80 can be adapted to include first and second flat portions 88, 89 to improve stability of the cover 26 when the cover 26 is in a closed, partially open, or widely open position. In a closed position (as shown in FIG. 12), the leaf spring 40 remains in a flexed configuration. The leaf spring 40 produces a counterclockwise moment on the hinge structure 80 defined by the product of the spring force and the line segment from point B of flat portion 88 to the geometric center A of pivot arms 81, 82. As a consequence, the cover 26 is biased against movement in a clockwise direction and is stably maintained in a closed position. The flexible leg 42 is in slidable contact with point B of flat portion 88. To move the cover 26 from its closed position to a partially open position, the cover 26 is rotated in a clockwise direction sufficient to overcome the resistive force of the leaf spring 40 and to push point B of the hinge structure 80 along flexible leg 42 to a position where the moment shifts to a clockwise direction about axis A. The cover 26 is then biased in a clockwise motion. As shown in FIG. 13, when point C of first flat portion 88 comes into contact with the second flexible leg 42, the first flat portion 88 lies substantially adjacent to flexible leg 42. The leaf spring 40 generates a force through axis A and therefore any clockwise or counterclockwise moment about axis A is eliminated or substantially reduced. As a consequence, the cover 26 is biased against further movement in either a clockwise or counterclockwise direction and is stably maintained in a partially open position.

To move the cover 26 from a partially open position to a widely open position (as shown in FIG. 15), the cover 26 is rotated in a clockwise direction sufficient to overcome the resistive force of the spring 40 and to push point C of the hinge structure 80 along flexible leg 42 to a position where the moment shifts to a clockwise direction about axis A. The cover 26 is then biased in a clockwise motion. As shown in FIG. 15, when the second flat portion 89 lies substantially adjacent to flexible leg 42, the leaf spring 40 is in an unflexed configuration and thus no biasing forces from the spring 40 are imposed on the hinge structure 80. However, if a spring rate is selected such that the leaf spring 40 remains in a flexed configuration, then the leaf spring 40 generates a force through axis A and therefore any clockwise or counterclockwise moment about axis A is eliminated or substantially reduced. In either case, whether the spring is unflexed or flexed, the cover 26 is biased against further movement in either a clockwise or counterclockwise direction and is stably maintained in a widely open position.

Further clockwise movement of the cover 26 beyond the widely open position is biased against the resistive force of the spring 40 which imposes a counterclockwise moment on the hinge structure 80, and hence the cover 26. By overcoming the counterclockwise moment imposed by the spring 40, the cover 26 can be moved beyond the widely open position to a fully open position, as shown in FIG. 14. Movement beyond the fully open position is restricted by stop members 38 near the rear portion 32 of the socket member 30. The stop members 38 can be sized to restrict the maximum angular displacement of cover 26. As shown in FIG. 14, the flat portion 90 in proximity to the second flat portion 89 abuts the stop members 38 when the cover 26 is about 180 degrees from the front face 18 of the enclosure 10. In the preferred embodiment, the spring rate is selected so that the cover 26 attains its fully open position when the enclosure is installed such that the clockwise moment imposed by the weight of the cover 26 overcomes the counterclockwise moment imposed by the spring 40. For example, in a strand mount application, as shown in FIG. 4A, should the cover 26 be moved to a widely opened position, gravitational forces acting on the cover 26 will force the cover 26 to open further to a fully open position.

The present invention provides several advantages over some prior art enclosures. Unlike some prior art enclosures, which rely on an interference fit between the cover and the housing, or between the hinge structure and the socket member, the present invention is less restricted to the type of polymeric material that can be used to construct the enclosure. In some prior art enclosures, repeated bending and deflecting can fatigue the material beyond its elastic limit, eventually causing plastic deformation or fracture. Such enclosures may compensate for this drawback by the use of a more rigid or brittle plastic. A wider range of materials are suitable for the present invention since the material of the hinge structure 80 and socket member 30 is not subject to the bending and deflections experienced by interference fit type enclosures. According to the present invention, the leaf spring 40 is used as the flexing member and not the material of the enclosure 10. Consequently, the enclosure 10 can be constructed of a softer or more flexible polymeric material without the concern of material wear or deformation which is exhibited by some prior art enclosures.

The terminal block enclosure 10 can be installed in a variety of different configurations, including pole-mount, wall-mount, or strand-mount, without the inconvenience of hindered access to the interior region 16 of the enclosure 10. If a particular application requires installation in a congested work area so that movement of the cover 26 into a widely open position would be restricted, then the cover 26 can be opened to a partially open position where it will remain stable by means of the leaf spring 40 acting on the contoured surface 85 of the hinge structure 80. Access to the interior region 16 is substantially simplified since the cover 26 can be opened to one of two stable positions, or to a fully open position. Consequently, interior components, an be easily installed or serviced without having to remove the cover 26 or resist movement of the cover 26. This is particularly desirable in aerial applications, where accessibility may be hindered by a far reach, high winds, or strand vibrations. Unlike some prior art enclosures wherein the cover is urged towards either a closed or open position, in accordance with the present invention the cover is urged towards a closed, partially open, or widely open position.

Although the invention has been described in its preferred form with a certain degree of particularity, it is understood that the present disclosure of the preferred form has bee n made only by way of example and that numerous changes in the details of construction, operation and the combination and arrangement of parts may be resorted to Without departing from the spirit and the scope of the invention as hereinafter claimed.

I claim:

1. An enclosure for a terminal block that provides a telecommunications transmission connection, comprising:
   a) a housing defining an interior region adapted to support a terminal block therein; said housing having an open front face and including a rear wall, and a number of side walls that border the interior region;
   b) a cover attached to one side wall of the housing for covering said interior region and that is moveable to a partially open or a widely open position to allow access to the interior region of the housing;
   c) said one side wall of said housing including a socket member defining a groove therein;
   d) a hinge structure rotatably moveable within said socket member for attaching the cover to a side wall;
   e) biasing means seated within said groove and interposed between said hinge structure and said socket member for biasing said cover against rotatable movement and statically stabilizing said cover between a closed position and said partially open position, or between said partially open position and said widely open position; and
   f) said biasing means including a leaf spring having first and second flexible legs, the first of which is secured within said groove, the second of which contacts said hinge structure to provide a resistive force against rotatable movement of said hinge structure.

2. The enclosure of claim 1, wherein said socket member includes spaced apart bearing segments and said hinge structure includes generally cylindrical pivot arms that pivotally engage said bearing segments.

3. The enclosure of claim 1, wherein said hinge structure includes first and second flat Portions; said first flat portion being in contact with said second flexible leg when sail cover is in a partially open position; said second flat portion being in contact with said second flexible leg when said cover is in a widely open position.

4. The enclosure of claim 1, wherein said socket member includes a stop member to resist further movement of said cover beyond a fully open position when said cover has been moved to said fully open position.

5. The enclosure of claim 2, wherein said biasing means maintains a biasing force against said pivot arms thereby holding said pivot arms within said bearing segments.

6. The enclosure of claim 1, wherein said groove of said socket member includes a nub element and one of said flexible legs defines a hole to receive said nub element when said ore leg i s inserted within said groove.

7. The enclosure of claim 1, wherein said socket member further include s a retaining post to inhibit movement of said first flexible leg relative to said groove.

8. An enclosure for a terminal block that provides a telecommunications transmission connection, comprising:
   a) a housing defining an interior region adapted to support a terminal block therein; said housing having an open front face and including a rear wall, and a number of side walls that border the interior region;
   b) a cover attached to one side wall of the housing for covering said interior region and that is moveable to a partially open or a widely open position to allow access to the interior region of the housing;
   c) said one side wall of said housing including a socket member defining a groove therein;
   d) a hinge structure rotatably moveable within said socket member for attaching the cover to a side wall;
   e) biasing means seated within said groove and interposed between said hinge structure and said socket member for biasing said cover against rotatable movement in a first sense between a closed position and said partially open position, and in a second sense between said partially open position and said widely open position; and
   f) said biasing means including a leaf spring having first and second flexible legs, the first of which is secured within said groove, the second of which contacts said hinge structure to provide a resistive force against rotatable movement of said hinge structure.

9. An enclosure for a terminal block that provides a telecommunications transmission connection, comprising:
   a) a housing defining an interior region adapted to support a terminal block therein; said housing having an open front face and including a rear wall, and a number of side walls that border the interior region;

b) a cover attached to one side wall of the housing for covering said interior region and that is moveable to a partially open or a widely open position to allow access to the interior region of the housing;

c) said one side wall of said housing including a socket member defining a groove therein;

d) a hinge structure rotatably moveable within said socket member for attaching the cover to a side wall;

e) biasing means seated within said groove and interposed between said hinge structure and said socket member for biasing said cover against rotatable movement between a closed position and said partially open position, or between said partially open position and said widely open position;

f) said biasing means including a leaf spring having first and second flexible legs, the first of which is secured within said groove, the second of which contacts said hinge structure to provide a resistive force against rotatable movement of said hinge structure; and g) wherein said hinge structure includes first and second flat portions; said first flat portion being in contact with said second flexible leg when said cover is in a partially open position; said second flat portion being in contact with said second flexible leg when said cover is in a widely open position.

* * * * *